United States Patent Office

3,697,474
Patented Oct. 10, 1972

3,697,474
ORGANO-CLAY-POLYMER COMPOSITIONS
Horton H. Morris, James P. Oliver, and Paul I. Prescott, Macon, Ga., assignors to Freeport Sulphur Company, New York, N.Y.
No Drawing. Filed Oct. 30, 1969, Ser. No. 872,752
Int. Cl. C08f 45/06; C08k 1/12
U.S. Cl. 260—40 R                8 Claims

ABSTRACT OF THE DISCLOSURE

Polymeric materials which contain as a filler an inorganic material the surface of which has been reacted with an organo derivative of ortho titanic acid containing at least two hydrolyzable groups are described. The filled polymeric materials, which may contain other conventional ingredients, can be conventionally formed to provide products having improved properties.

BACKGROUND OF THE INVENTION (a) Field of invention

This invention relates to filled polymeric compositions in which the fillers have been pretreated to enhance their compatibility with polymeric material and improve the properties of the polymeric materials. More particularly, the invention relates to organic polymer compositions containing one or more inorganic fillers the surfaces of which have been reacted with an organic derivative of ortho titanic acid containing at least two hydrolyzable groups. The compositions can be readily formed into fibers, films and other shapes by the conventional processes used in the plastics industry.

(b) Description of the prior art

Inorganic particulate materials such as clays, calcium carbonate, barium sulfate, zinc oxide, titanium dioxide, diatomaceous earth, etc. have long been used in polymeric compositions to provide opacity and to act as delustrants in the objects made therefrom. Fibers formed from such compositions are used in fabrics for garments, yard goods, curtains and draperies, upholstery, bedding, and table linens; in yarns and knit goods; in carpeting; in tapes; in synthetic paper; and in other woven and non-woven goods such as scrim, ropes, filters, rug backing, staple, synthetic hair, and as fillers for other polymer systems; films from such compositions have been used for packaging materials, including heat sealable flat stock and bags, as printed sheets and wrappers, as oriented films, as synthetic capacitor paper and in oil filled, synthetic paper, cable insulation and in other applications where flexible plastic sheet materials are required for moisture and air barriers. Films have also been used for covering, or containing objects, materials or surfaces. Additionally, such compositions have been molded, extruded or otherwise formed into various shapes for a wide variety of end uses.

Unfortunately, the amount of inorganic material that can be used is quite limited since large amounts thereof reduce the strength of the compositions markedly so that they are unacceptable for the intended use. For example, it has been found that fibers and thin films can tolerate no more than about 5 weight percent of inorganic filler without losing substantial strength properties.

Presumably, the loss of physical integrity when large amounts of inorganic filler is used is related to the surface energy of both the inorganic material and the polymer, which in turn relates to the adhesion of the polymer to the inorganic surface. The adhesion of the polymer to the filler is also dependent on the temperature of the system and on the degree of compatibility of the filler with the polymer. At constant temperature, the work of adhesion $W_a$, can be defined by the equation:

$$W_a = V_f + V_p - V_{fp}$$

where $V_f$ represents the surface energy of the inorganic material, $V_p$ represents the surface energy of the polymer system, and $V_{fp}$ represents the surface energy of the interface or the degree of incompatibility of the inorganic material and polymer surfaces. When $W_a \geq 2V_p$ the polymer should adhere strongly to the inorganic surface and the polymer can be said to wet the inorganic material. When $W_a < 2V_p$ the polymer should not wet the inorganic material and the inorganic material may be surrounded by a void. Filled compositions which have a high filler-polymer incompatibility and/or low filler surface energy will have a low filler tolerance level.

Cable insulation is another field in which inorganic fillers, primarily clays have been used with polymers in the form of extruded solid dielectric insulation. The fillers are added in the order of 2 to 150 weight percent based on the polymer and are used to impart a physical ruggedness to the insulation which manifests itself by an increase in the insulation tensile strength, hardness and deformation resistance. However, the addition of hydrophilic clays to power cable insulation results in the creation of paths through which moisture can readily penetrate. Moreover, the incorporation of clays with a low surface energy and/or a high degree of incompatibility between the clay and the polymer system (a high interfacial surface energy) results in the formation of voids in the extruded cross-linked insulation. Thus, hydrophilic clay in the insulation in the presence of moisture, results in an insulated cable with a high percent power factor (high dielectric losses). The high percent power factor in an energized cable results in excessive energy transmission losses and eventual cable failure through dielectric heating. Voids, 2 mils and larger, in a cable insulation will ionize (internal discharges across the void through gases trapped in the void) depending on the location of the void and the electrical stress across the cable insulation. The ionization in the void results in an increase in the size of the void and, since the intensity of the discharge across the void increases with the size of the void, the continued ionization results in cable failure by burnout. Therefore, as will be readily apparent to those skilled in the art of power cable insulation, it is highly desirable, in order to obtain the best cable insulation, that a hydrophobic filler with a surface energy equal to or greater than the surface energy of the polymer system and with a degree of incompatibility approaching zero is needed in power cable insulation.

OBJECTS OF THE INVENTION

One object of this invention is to provide polymeric systems containing from 2 to 200 weight percent of an inorganic filler, based on the total weight of the polymer, without undue loss of properties of the polymeric system.

A further object of this invention is to provide a polymeric system capable of being fabricated into fibers and films containing from 2 to 150 weight percent, based on the total weight of the polymer, of a particulate inorganic filler.

Another object is to provide an inorganic, preferably clay, filled insulating polymeric composition containing from 2 to 150 weight percent of filler based on the total weight of the polymer.

Another object of this invention is to provide an inorganic filler-polymer composition having good hardness, low mold shrinkage and a resistance to crazing and cracking.

Yet another object of the invention is to provide a polymeric composition which contains a hydrophobic and organophilic inorganic, preferably clay, filler having a polymer wettable surface and surface energy equal to or greater than the surface energy of the polymer and having a degree of incompatibility with the polymer approaching zero.

Still another object of the invention is to produce an inorganic, preferably clay, filled translucent film.

A further object of the invention is to provide a polymeric composition which contains a hydrophobic inorganic filler which acts as an internal mold release agent.

SUMMARY OF THE INVENTION

These and other objects are attained by incorporating into an organic polymer an inorganic filler which has been reacted prior to the incorporation with an organotitanium compound containing at least two hydrolyzable groups.

The organo titanium compounds used to react with the inorganic filler material are represented by the formula $Ti(OR)_m R'_{4-m}$ wherein R is a hydrocarbon radical containing from 1 to 12 carbon atoms and R' may be OCOR", OR''' or a hydrocarbon substituted silicic acid radical (OSiR") wherein R" is a substituted or unsubstituted hydrocarbon radical having from 1 to 40 carbon atoms and wherein R''' is a substituted or unsubstituted hydrocarbon radical having from 6 to 40 carbon atoms providing that R''' and R are not identical. In the formula m is equal to 2 or 3. At least two hydrolyzable groups, preferably OR groupings, must be present in the organo titanium compound in order that hydrolysis of the organo titanium compound occurs followed by its polymerization to produce a film of organo-substituted titanium oxide at the filler surface. Through this reaction hte filler is provided with a hydrophobic, organophilic film.

The organo titanium compounds may be prepared by reacting 1 mol of $Ti(OR)_4$ with from 1 to 2 mols of a compound represented by the formula AR' wherein A is hydrogen or a group capable of reacting to remove an OR from the $Ti(OR)_4$ molecule and R' is as described above. A mixture of two or more compounds of the formula AR' may be used. The preparation of illustrative organo titanium compounds is more particularly described in Langkammerer's U.S. Pat. 2,621,193 [see also p. 15 of the E. I. du Pont de Nemours & Co. publication entitled "Tyzor," Versatile Chemicals for Industry (1965, revised 1966) which described the reaction product of Langkammerer's process as a monomer whose formula is identical to the $Ti(OR)_m R'_{4-m}$ formula given above, but which also points out that the monomers are unstable and under certain conditions may decompose by reacting with one another to yield a polymeric reaction product of a structure identical to that shown in col. 4, lines 51–58 of the Langkammerer patent; as pointed out by Langkammerer (col. 4, lines 40–42), the exact structure of this polymeric reaction product is unknown.

Reverting to the starting material $Ti(OR)_4$, R may be selected from the group consisting of alkyl, cycloalkyl, aryl, aralkyl, and alkaryl radicals containing from 1 to 12 carbon atoms. Specific examples of compounds represented by the formula are tetramethyl titanate, tetraethyl titanate (ethyl orthotitanate), tetrabutyl, tetraisopropyl, tetraamyl, tetraoctyl, tetradodecyl, tetra-2-ethyl-hexyl, tetrabenzyl, tetraphenyl and tetra-bentanaphthyl titanates.

The radical R" menioned above represents a hydrocarbon radical having from 1 to 40 carbon atoms taken from the group consisting of alkyl, cycloalkyl, aryl, aralkyl, alkaryl hydrocarbon radicals which may contain various substituents such as halogens, e.g., a perfluoro methyl radical, hydroxyl groups, keto group (radical of levulinic acid) amino, nitro and heterocyclic groups. Examples of R" groups are methyl, ethyl, propyl, butyl, pentyl, hexyl, heptyl, octyl, octadecyl, cyclohexyl, cycloheptyl, phenyl, naphthyl, tolyl, xylyl, benzyl, phenyl ethyl chlorophenyl, dibromophenyl, 2,3-dihydroxy propoxy. The various hydrocarbon radicals may contain aliphatic unsaturation as well as aromatic unsaturation. Perfluoro compounds may be used. R''' is of similar scope but with the exclusion of radicals containing 5 or less carbon atoms.

A preferred class of compounds represented by the formula AR' are the organic aromatic and aliphatic carboxylic acids. The resulting organo titanium compound may be called an ester carboxylate or an ester anhydride of ortho titanic acid. Among the aliphatic and aromatic organic acids that may be used are straight or branch chain, saturated or unsaturated, substituted or unsubstituted mono- or poly-carboxylic acids including such acids as stearic, palmitic, ricinoleic, linoleic, lauric, myristic, oleic, benzoic caproic, caprylic, nonylic, capric, linseed oil acids, castor oil acids, tall oil acids, cocoanut oil acids, soybean oil acids, tung oil acids, perfluorooctanoic acid, phthalic acid, adipic acid, etc.

A second class of useful compounds which generally be used in conjunction with one of the acids cited above, although they can be used as sole component of the reaction with the $Ti(OR)_4$ are the organic alcohols or organic phenols. Among such compounds are 2-phenoxyethanol, m-cresol, diethylene glycol, 2,6-dioctadecyl cresol, 1-(2-pyridylazo)-2-naphthol, naphthol, anisyl alcohol, glycerol, geraniol, etc.

In some cases the combined effect of the two classes just cited may be obtained by using an ester such as the triglyceride of ricinoleic acid.

The inorganic fillers of this invention comprise fillers in particulate (of any particle size distribution and any particle shape) or fibrous form. As long as the inorganic filler contains at its surface reactive hydroxy groups and/or about 0.1 to about 2 weight percent based on the filler of adsorbed water, the specific chemical nature of the filler is not important. Such widely diversified materials as steel wool, silicon whiskers, alumina, clays and iron filings may be used depending on specific properties desired in the end product. Other well known inorganic fillers are calcium carbonate, barium sulfate, glass in the form of fibers or thin platelets, vermiculite, asbestos, mica, etc. All of these materials have the property of being chemically inert to most of the polymeric materials and are relatively heat resistant as compared to the polymeric material.

Clays are a preferred inorganic filler because of the superior physical properties of the treated clays of our invention in comparison with the untreated clays, the ready availability of the clays and their relatively low cost. Illustrative clays are untreated or treated (e.g., calcined or delaminated) English or Georgia filler and coating clays. Clays are composed of two atomic lattice structural units. One consists of two sheets of closely packed oxygen atoms or hydroxyl groups in which aluminum (and occasionally iron or magnesium) atoms are embedded in octahedral coordination. The second unit is built of silica tetrahedrons, usually arranged so as to form a hexagonal network, which is repeated indefinitely to form a sheet-like structure. In kaolinite, the structure is composed of a single tetrahedral sheet and a single aluminum octahedral sheet combined in a unit so that the tips of the silica tetrahedrons and one of the layers of the octahedral sheet form a common layer. The aluminum sheet, in a unit cell, carries six hydroxyl groups, which appear on one surface of the cell and two hydroxyl groups which project toward the center of the cell. The structural formula can be represented by $(OH)_8Si_4Al_4O_{10}$. Clay minerals therefore contain hydroxyl groups which can be pictured as potential reaction sites. Clay minerals are also very finely divided and have surface areas varying from about one square meter per gram up into the 100 square meter per gram range. Like all finely divided and fibrous materials water is generally adsorbed onto the clay particles in very small amounts and can serve as a reaction site.

The inorganic filler-organo titanate products are formed by dissolving the organo titanate in an anhydrous organic solvent, wetting the surface of the inorganic filler with the solution and maintaining contact between the two materials until reaction is completed. Generally the reaction occurs spontaneously but, in some cases, gentle heating is required to speed the reaction. The solvent and hydrolysis products are then removed by distillation or filtration. As a result of this treatment it is believed an extremely thin layer of an organic substituted titanium compound or hydrated titanium oxide is formed by hydrolysis of the titanium compound on the surface of the inorganic material, due to the presence of hydroxyl groups in the inorganic filler, e.g., in conventional clays, or due to the presense of a trace of adsorbed water. Whatever the mechanism the product is stable to further processing conditions.

The amount of organo titanate used will vary from about 0.5 to about 6 weight percent based on the dry weight of the inorganic material, the amount used being partially dependent on the surface area of the inorganic material since it is essential that substantially all of the surface area be reacted. The organo titanate should generally be dissolved in a solvent which does not react with the titanate. Such solvents are hydrocarbons such as naphtha, hexane, octanes, etc. and chlorinated hydrocarbons such as trichloroethylene. The solvents should be anhydrous. In the event that the organotitanium compound is volatile the inorganic material may be directly reacted with it by passing the gaseous material across the inorganic surfaces. The volatile organo titanate may be diluted with a dry inert gas to facilitate this process. If the inorganic material lacks reactive hydroxyl groups at its surface and has been subjected to severe drying conditions, it will be necessary to mix it with water such that its surface contains from about 0.1 to about 2 weight percent of water prior to the reaction with the organo titanate.

The particle size and shape of the inorganic material is important only with respect to the end use of the filled polymeric composition. Thus, a very fine particle size may be desired, e.g., if the polymer composition is to be spun into fibers through very fine openings in a spinnerette, or a relatively coarse size may be needed if the composition is to be used for oil spill treatment. Fibers, whiskers, and exfoliated materials are used for compositions to be fabricated into composite products of high strength.

The treated inorganic material as described is set out and claimed in commonly assigned application Ser. No. 872,730, filed concurrently herewith.

The organic polymeric materials of this invention inclue both addition and condensation polymers. An important class of polymers are those obtained by polymerizing or copolymerizing organic compounds containing a carbon-carbon double bond. Such polymers include the polyalkenes formed from monomers such as ethylene, propylene and isobutylene; the polydialkenes formed from monomers such as butadiene and isoprene; the halogenated polyalkenes from monomers such as tetrachloroethylene, chlorotrifluoroethylene, and tetrafluoroethylene; the vinyl resins such as polyvinyl acetal, polyvinyl acetate, polyvinyl alcohol, polyvinyl butyral, polyvinyl formal, polyvinyl carbazone, polyvinyl chloride and polyvinylidene chloride; the polystyrenes formed from such monomers as styrene, alpha-methyl styrene and the chlorostyrenes; and acrylic resins formed from such monomers as acrylic acid, methacrylic acid and the esters and nitriles thereof such as methyl acrylate, ethyl acrylate, methylmethacrylate, acrylonitrile and methacrylonitrile.

Other applicable polymeric materials are the cellulose derivatives including cellulose esters such as cellulose acetate, cellulose triacetate, cellulose acetbutyrate and cellulose propionate, and cellulose ethers such as methyl or ethyl cellulose, cellulose nitrate, rayon, cellophane, etc.

Acetal resins form another group of suitable polymeric materials. The class comprises those resins formed by the addition polymerization of formaldehyde or higher aldehydes to produce oxymethylene or substituted oxymethylene linkages.

Condensation polymers formed by the reaction of formaldehyde with various organic compounds may also be used. Typical of these polymers are the phenolic resins formed by condensation of phenol, cresol, xylenol or other hydroxy aromatic compounds with aldehydes such as formaldehyde or other higher aldehydes; the melamine resins formed by condensation of melamine and substituted melamines with formaldehyde or higher aldehydes; and the urea resins formed by the condensation of urea and substituted ureas with formaldehyde and higher aldehydes.

Either synthetic or natural polymers can be used in our invention although synthetic polymers are preferred.

Other applicable polymeric materials include the furan resins obtained by the polymerization of furfural or furfuryl alcohol and by the copolymerization of furfural and a ketone; coumarone-indene resins; casein resins, silicone elastomers; polycarbonate resins formed by polymerization of unsaturated cyclic esters of carbonic acid such as vinylidene carbonate and allyldiglycol carbonate or by condensation of phosgene with a diol; epoxy resins formed by condensation of a halogenated alkylene oxide such as epichlorohydrin with a polyhydric compound such as ethylene glycol or bis-phenol.

A further class of suitable resins are the polyesters. These resins are formed by the reaction of a polyhydric alcohol with a saturated or unsaturated polycarboxylic acid, acid anhydride, or acyl halide and include polyesters formed from an unsaturated acid and an alkylene glycol or dialkylene glycol, which is subsequently cross-linked by further reaction with a compound containing a vinylidene group such as styrene, ethyl acrylate, methyl methacrylate, acrylonitrile, vinyl acetate or acrolein.

Another class of resins are the polyurethane resins prepared by the reaction of polyols, polyesters, or polyethers with a polyisocyanate such as tolylene diisocyanate. Other resins are the polyamides produced by the condensation of a diamine with a dicarboxylic acid, or by the addition polymerization of cyclic amides. The polyamides include the nylons such as nylon 6 (from epsilon-caprolactam) and nylon 66 (from hexamethylene diamine and adipic acid).

Another related group of resins include the copolymers and terpolymers of the above groups. Examples are copolymerized butadiene-styrene, vinyl chloride vinyl acetate, vinyl chloride-vinyloxyethanol, ethylene-maleic anhydride, butadiene-styrene-divinyl benzene and styrene-epoxide-maleic anhydride.

The compositions of this invention are prepared by simply mixing the polymeric material with the treated filler using any of the conventional means common to the plastics industry. Thus the polymer may be mixed on roll mills at elevated temperatures until soft and the dried filler added during the milling action. Alternatively, the polymer and filler may be mixed together in ball mills, dough mixers with or without added solvent and other conventional additives such as plasticizers, antioxidants, lubricants, dyes, etc. The compositions may then be molded, cast, and extruded into a variety of sizes, shapes, contours, and thicknesses as desired. Molded articles may be conventionally produced, e.g., by injection molding, extrusion molding, matched die molding, preform molding, blow molding, compression molding and other types of molding where dies of the configuration desired are used to contain the thermoplastic or thermosetting polymeric material. Cast goods are prepared from viscous solutions of the compositions by pouring or spraying into a mold or onto a smooth surface. Extruded goods are made in long lengths by screw or ram feed through a die. The molded, cast and extruded goods comprise the largest use of the compositions of this invention. The finished products are used in automotive parts, airplanes, boats, missiles, space exploration, toys, furniture, construction materials, both structural and decorative, containers, packaging material and pipe and tubing.

When the compositions are to be used for cable insulation, the amount of treated filler used may range from 2 to 200 weight percent based on the weight of the polymer. Preferred polymers for this use are polyethylene, chlorinated polyethylene, chlorosulfonated polyethylene, polyvinyl chloride, neoprene, isoprene, butyl rubber, natural rubber, nitrile rubber, ethylene-propylene rubber, ethylene-propylene terpolymer, polypropylene, silicone rubber, and polysulfone. The preferred filler for cable insulation is clay. The polymer composition may be used as is or may be modified by the addition of crosslinking agents such as organic peroxides and sulfur derivatives.

When the compositions are to be used for fibers and films, the inorganic filler should generally be in finely divided form and should be present in amounts ranging from 2 to 60 weight percent based on the weight of the polymer. Preferred polymers for fibers and films are polyolefins, e.g., polyethylene, polypropylene, chlorosulfonated polyethylene, chlorinated polyethylene, etc. The particular filler used will depend on the end use envisioned. For example, if a fiber or film having magnetic properties is desired the filler should be iron filings or magnetizable iron oxides.

When the compositions are to be used to form high strength composites, the filler will usually be in fiber or whisker form and the polymeric material will be a condensation resin such as the phenolic and melamine resins or a polyester-styrene resin.

The following examples are given in illustration of this invention and are not intended as a limitation thereof. Where parts are mentioned they are parts by weight.

EXAMPLE I

Triisopropyl monooleic titanate was prepared by mixing 258 grams (0.91 mole) of tetraisopropyl titanate with 256 grams (0.91 mole) of oleic acid at room temperature accompanied by stirring. The mixture became warm immediately indicating the occurrence of the desired reaction, and was allowed to stand for several minutes. The product was triisopropyl monooleyl titanate dissolved in isopropyl alcohol. Without removing the alcohol the product was mixed with 50 pounds of naphtha to produce a low viscosity solution containing the titanate. Thereafter thirty pounds of a fine particle size delaminated kaolin was added slowly to the naphtha solution accompanied by vigorous stirring to prevent lumping of the clay. After complete addition of the clay to give a 38% solids dispersion in naphtha, the mixture was stirred for an additional half hour. The dispersion was then dried to remove naphtha and isopropyl alcohol and the product therefrom was pulverized. The product, designated OX-1, did not appear, on visual examination, to be any different from the original kaolin.

To determine the effect of the treatment of the clay with the organo titanium derivative 3 grams of the OX-1 and 3 grams of the untreated kaolin were separately shaken vigorously with 15 grams of water in a test tube. The tubes were then allowed to stand until the kaloin either settled to the bottom or floated on the surface of the water. The amount of OX-1 which settled out, as determined gravimetrically, was less than 0.1 percent showing that OX-1 was hydrophobic whereas all of the untreated kaolin was wetted by the water within 10 seconds of the standing period.

EXAMPLE II

Three hundred and fifty grams of polypropylene having a melt index of 15 grams per 10 minutes at 230° C. was banded on a rubber mill between rolls heated to 360° F. and milled for 15 minutes. Thereafter 150 grams of OX-1 was slowly added to the polypropylene on the milling rolls and milling was continued for 15 minutes to ensure complete dispersion of the filler in the polymer. The composition thus prepared was sheeted off the rolls, cooled and granulated. The composition showed no tendency to stick to the hot rolls of the mill. To further ensure a uniform dispersion of the filler in the polymer, the composition was pelletized by passing it through three heat zones of an extruder with all zones (feed zone, metering zone and die) heated to 260° C. Two stainless steel screens, 40 mesh and 250 mesh, respectively, were placed in front of the breaker plate to further disperse the OX-1 in the polypropylene and to remove any large agglomerate material. The composition extruded at a rate of 37.2 grams per minute through a ⅛" rod die directly into a cold water quench bath. The quenched rod was then pelletized and dried in a vacuum oven at 100° C.

The pelletized composition was dry spun into fibers using an extruder equipped with a metering pump and a 16 hole spinnerette, each hole being 12 mils in diameter. The spinnerette assembly contained a packing of metal balls about $\frac{1}{16}$" in diameter on top of a 40 mesh and a 250 mesh screen. For this spinning trial, the composition feed zone to the extruder was heated to 150° C., the feed zone on the screw was at 250° C., the metering zone on the screw was at 260° C., and the metering pump and spinnerette assembly were at 260° C. The composition was extruded through the spinnerette at 18 grams per minute and was cross wound onto a spool at 2700 feet per minute. These conditions produced a fiber of 8 to 10 denier. The fiber, when oriented by drawing over a shoe heated to 135° C. at a draw ratio of 3–5 to 1 gave a fiber of 3 to 4 denier having an average diameter of 26 microns. The fibers thus produced had a low luster, were opaque and exhibited a high degree of resilience. Scanning electron photomicrographs showed the fiber to be virtually free of voids before orientation and to contain few voids after orientation.

Using the same composition and a spinnerette having 20 mil diameter holes and substantially the same operating conditions 15–17 denier unoriented fibers were obtained which also were opaque, of low luster and high resiliency.

The dry pelletized composition was extruded into thin films using an extruder equipped with a 6" slit die adjusted to produce a 5 mil film. Directly facing the die and about one inch from the die was a water cooled chill roll used to quench the extruded film. The extruder was set up with a 40 mesh and a 250 mesh screen on front of the breaker plate and a temperature profile of 245° C. at both the feed zone and the metering zone on the screw and 238° C. at the die. The composition was extruded at a constant rate and quenched on the chill roll revolving at a circumferential speed of 7, 11, and 16 feet per minute to produce film of 3, 2 and 1 mil thicknesses, respectively. The films thus produced containing 30 weight percent filler were slightly yellow and translucent. The 3 mil film when oriented at 120° C. under a load of 6 pounds produced a uniaxially oriented translucent film, 0.85 mil thick with a tensile strength ranging from 24,700 to 33,000 p.s.i.

If untreated kaolin is used instead of the OX-1 the composition will stick badly to the mills' rolls during the compounding steps and fibers and films made therefrom are weak.

EXAMPLE III

Example II was repeated using a higher molecular weight polypropylene having a melt index of 6.5 grams per 10 minutes at 230° C. As in Example II the composition did not stick to the milling rolls during the compounding step and fibers produced from the composition were opaque, of low luster and high resilience.

EXAMPLE IV

Using the polypropylene of Example III, compositions were prepared containing 20 and 30 weight percent of OX-1. These compositions were extruded through a 6" slit die adjusted to form a 30 mil film. Using a profile of 245° C. at the feed zone, 250° C. at the metering zone and 244° C. at the die the compositions were extruded at a rate of about 89 grams per minute into a cold water quench bath and the film thus produced was taken up between variable speed metering rolls at the rate of 24 feet per minute. The film produced from both compositions was 5 mils thick, slightly yellow and translucent.

Substitution of OX-1 with the reaction product of iron oxides (e.g., magnetite) or iron powders and diisopropyl dioleyl titanate in the above will give a material which can be magnetized in part or in whole, and at will by exposing the material to a magnetic field. Incorporating a subsequent demagnetization step would allow the material to be reused.

EXAMPLE V

Diisopropyl dioleyl titanate was prepared by mixing 972 grams (3.42 moles) of tetraisopropyl titanate with 1943 grams (6.84 moles) of oleic acid at room temperature, stirring the mixture which became warm on mixing and allowing the mixture to stand. The product was diisopropyl dioleyl titanate dissolved in isopropyl alcohol. The product was then dissolved in 53 gallons of trichloroethylene and 430 pounds of calcined clay containing about 0.4% adsorbed water was slowly added to the solution over a period of 15 minutes accompanied by constant stirring. The resultant 40% solids slurry was further agitated for about 30 minutes and then pumped to an evaporator where the trichloroethylene and the isopropyl alcohol formed during the reaction was removed. The dry product was collected, micropulverized and bagged. Analysis showed that the clay had retained about 1.5% by weight of the organo titanate.

Using the test for hydrophobicity set forth in Example I, the above treated clay was shown to be 99.99% hydrophobic whereas the untreated clay was completely hydrophilic.

An electrical grade ethylene-propylene rubber (EPR) was compounded using the treated clay (OX-2) and other ingredients as listed in Table I to produce an insulating material. The compounding was accomplished on a two roll steam heated rubber mill with the roll temperature set at 310° F. The compound ingredients of Table I are listed in the order of their addition on the mill.

TABLE I.—EPR COMPOSITION

| Ingredients: | Parts |
| --- | --- |
| EPR | 100 |
| Zinc oxide | 5 |
| 90% lead peroxide | 5.6 |
| Trimethyl dihydroquinoline polymer | 1.5 |
| Trialkyl cyanurate | 1.5 |
| OX-2 | 110 |

The EPR was first banded on the mill and then each ingredient added in turn and thoroughly mixed by cutting and folding the composition on the mill. After the final ingredient had been added mixing was continued for about 10 minutes. The composition was then sheeted off the mill and allowed to stand at room temperature overnight. The composition was then put back on the rubber mills at 250° F. and 7.0 grams of a catalyst (dicumyl peroxide) was added and mixed for 5 minutes and then sheeted from the rolls. The composition was molded and cured into 6" x 6" test panels 90 mils thick by compression molding between steam heated platens at 270° F. for one hour.

Similar compositions were prepared in the same way but using untreated calcined clay instead of the OX-2. During the compounding operations the composition containing the untreated clay stuck badly to the rolls, whereas the composition containing the OX-2 showed no tendency to stick.

Table II shows that on exposure to water the composition containing the untreated clay had poor electrical properties, whereas the composition containing the OX-2 had good electrical properties.

TABLE II.—ELECTRICAL DATA—EPR COMPOSITIONS

| | OX-2 | Clay |
| --- | --- | --- |
| Volume resistivity ohms-cm. $\times 10^{-12}$ [a] | 8 | 6 |
| Dielectric constant [a] | 3.12 | 3.07 |
| Dissipation factor, percent [a] | .26 | .24 |
| Volume resistivity [b] | 1.0 | 0.2 |
| SIC [b] | 3.24 | 4.91 |
| Power factor [b] | .54 | 14.5 |
| Volume resistivity [c] | 1.2 | |
| SIC [c] | 3.23 | |
| Power factor [c] | .49 | |

[a] Time=15 hours; Temperature=90° C.; Condition=Air oven.
[b] Time=6 days; Temperature=90° C.; Condition=In water.
[c] Time=9 days; Temperature=90° C.; Condition=In water.

EXAMPLE VI

A composition was prepared as in Example V, except that an organo titanium compound prepared from one mole of tetraisopropyl titanate and one mole of oleic acid was used and the product was dried, precipitated in water and then recovered therefrom. Instead of reacting the dried material with the clay, it was incorporated into the composition on the mill rolls. The electrical properties of the cured composition after 6 days in 90° C. water were volume resistivity of $0.4 \times 10^{12}$ ohms-cm., SIC of 3.83 and dissipation factor of 4.4%. These properties are similar to those found using the untreated clay, indicating that pretreatment of the clay involving a hydrolysis of the organo titanium compound onto the clay is essential.

EXAMPLE VII

A series of compositions were made using a commercial liquid uncatalyzed polyester-styrene resin (Selectron 50204 of PPG Industries—the polyester being the polymerization product of a dibasic anhydride and a polyhydric alcohol) and a number of different inorganic fillers treated with various organo titanium compounds. In each instance, 300 grams of polymeric material and 300 grams of treated filler were used with the latter being added with agitation slowly in 50 gram increments. To facilitate the reporting of data and to distinguish between one type of reaction product and another, torque measurements were made on the 50:50 mixtures and tabulated as set forth in Table III.

TABLE III

| Run number | Starting pigment | Reactants[1] | Mole ratio of reactants | Treatment level as percent of clay | Torque (meter/grams) |
|---|---|---|---|---|---|
| 1 | Clay | | | | 680 |
| 2 | do | TPT plus castor oil | 1:1 | 3.5 | 175 |
| 3 | do | TPT plus geranil plus oleic acid | 1:1:1 | 4 | 145 |
| 4 | do | TPT plus phenol plus oleic acid | 1:1:1 | 3.5 | 150 |
| 5 | do | TPT plus M-cresol plus oleic acid | 1:1:1 | 3.5 | 165 |
| 6 | do | TPT plus oleic acid plus geraniol | 1:1:1 | 4 | 160 |
| 7 | do | TPT plus glycerol plus oleic acid | 1:.75:1 | 3.8 | 170 |
| 8 | do | TPT plus oleic acid | 1:1 | 3.5 | 315 |
| 9 | do | TPT plus n-decanol | 1:1 | 3.0 | 180 |
| 10 | do | | | | 480 |
| 11 | do | TPT plus oleic acid | 1:1 | 3.5 | 360 |
| 12 | do | TPT plus docosanoic acid | 1:1 | 3.0 | 70 |
| 13 | do | | | | 650 |
| 14 | do | TPT plus oleic acid | 1:1 | 3.5 | 370 |
| 15 | do | | | | 100 |
| 16 | do | TPT plus oleic acid | 1:1 | 3.5 | 60 |
| 17 | Calcium carbonate | | | | 60 |
| 18 | do | TPT plus oleic acid | 1:1 | 3.5 | 30 |
| 19 | Ferric-ferrous oxide | | | | 131 |
| 20 | do | TPT plus oleic acid | 1:1 | 3.5 | 57 |
| 21 | Zinc chromate | | | | 96 |
| 22 | do | TPT plus oleic acid | 1:1 | 3.5 | 87 |
| 23 | Titanium dioxide | | | | 96 |
| 24 | do | TPT plus oleic acid | 1:1 | 3.0 | 52 |

[1] TPT=tetraisopropyl titanate.

In all cases where the inorganic filler had been treated with an organo titanium compound, the viscosity (torque required to cause the material to flow) of the composition was markedly reduced as compared to the compositions containing the untreated filler.

EXAMPLE VIII

Polyethylene having a melt index of 4.6 was blended with varying amounts of OX-1 on a two roll rubber mill and the composition thus formed was compression molded into ⅛″ slabs. Tensile test specimens were then cut from the slabs and the break strength determined on an Instron tester. The break strength of the polyethylene compounded with 0, 33, 50 and 60 weight percent of OX-1 was 1860 p.s.i., 1860 p.s.i., 2190 p.s.i. and 2000 p.s.i., respectively. When untreated kaolin is used the break strength falls off rapidly as filler loading is increased.

It is obvious that many variations of the foregoing may be made without departing from the spirit and scope of this invention as set forth in the appended claims.

What is claimed is:

1. A composition of matter comprising a polymeric material having incorporated therein an inorganic filler the surfaces of which, prior to the incorporation step, have been reacted with an organo titanium compound containing at least two hydrolyzable groups and which is represented by the formula $Ti(OR)_m R'_{4-m}$ wherein R is a hydrocarbon radical containing from 1 to 12 carbon atoms and R' is OCOR″, OR‴ or OSiR″ wherein R″ is a substituted or unsubstituted hydrocarbon radical having from 1 to 40 carbon atoms and wherein R‴ is a substituted or unsubstituted hydrocarbon radical having from 6 to 40 carbon atoms providing that R‴ and R are not identical and wherein $m$ is equal to 2 or 3, said inorganic filler prior to reaction with said organo titanium compound containing at its surface either adsorbed water, in an amount ranging from about 0.1 to about 2 percent, weight percent, based on the filler or reactive hydroxyl groups or both reactive hydroxyl groups and the adsorbed water, whereby the hydrolyzable groups of said compound are hydrolyzed by said adsorbed water or reactive hydroxyl groups, or both, to produce a polymeric organo titanium compound at the surfaces of said inorganic filler.

2. A composition of matter as in claim 1 wherein the organo titanium compound is triisopropyl monooleyl titanate.

3. A composition as in claim 1 wherein the organo titanium compound is diisopropyl dioleyl titanate.

4. A composition of matter as in claim 1 wherein the inorganic filler is in fine particulate form and is present in the composition in amounts varying from 2 to 200 parts by weight based on 100 parts of polymeric material.

5. A composition of matter as in claim 1 suitable for cable insulation wherein the inorganic material is clay present in amounts ranging from 2 to 200 parts by weight based on 100 parts of the polymeric material.

6. A composition of matter as in claim 1 wherein the polymeric material is polypropylene.

7. A composition of matter as in claim 1 wherein the polymeric material is an ethylene-propylene rubber.

8. A composition of matter as in claim 1 wherein the polymeric material is a polyester-styrene copolymer.

References Cited

UNITED STATES PATENTS

| | | | |
|---|---|---|---|
| 2,621,193 | 12/1952 | Langkamerer | 260—429.5 |
| 3,025,172 | 3/1962 | Berstein | 106—30 |
| 3,025,173 | 3/1962 | Berstein | 106—32 |
| 3,154,461 | 10/1964 | Johnson | 161—116 |
| 3,432,323 | 3/1969 | Wigginton | 106—300 |

LEWIS T. JACOBS, Primary Examiner

J. H. DERRINGTON, Assistant Examiner

U.S. Cl. X.R.

106—193 R, 288 Q, 299, 308 Q; 260—37 R, 37 SB, 37 EP, 37 N, 38 R, 39 R, 39 SB, 41 R, 41 A, 41.5 R, 41.5 A